(12) United States Patent
Sakuma et al.

(10) Patent No.: US 11,034,343 B2
(45) Date of Patent: Jun. 15, 2021

(54) ASSEMBLY AND INSPECTION CART FOR PRECISION EQUIPMENT

(71) Applicant: MITUTOYO CORPORATION, Kanagawa (JP)

(72) Inventors: Mitsuyoshi Sakuma, Ibaraki (JP); Katsuyuki Ogura, Tochigi (JP)

(73) Assignee: MITUTOYO CORPORATION, Kanagawa (JP)

( * ) Notice: Subject to any disclaimer, the term of this patent is extended or adjusted under 35 U.S.C. 154(b) by 299 days.

(21) Appl. No.: 16/211,881

(22) Filed: Dec. 6, 2018

(65) Prior Publication Data
US 2019/0176863 A1    Jun. 13, 2019

(30) Foreign Application Priority Data

Dec. 8, 2017  (JP) .............................. JP2017-235925

(51) Int. Cl.
*B60V 1/11*     (2006.01)
*B65G 7/06*     (2006.01)

(52) U.S. Cl.
CPC ................ *B60V 1/115* (2013.01); *B65G 7/06* (2013.01)

(58) Field of Classification Search
CPC .................................................... B60V 1/115
See application file for complete search history.

(56) References Cited

U.S. PATENT DOCUMENTS 3,548,967 A * 12/1970 Bertin ...................... B60V 1/04
                                                                 180/117
3,548,968 A * 12/1970 Aronson ................ B60V 1/115
                                                                 180/119
4,063,611 A * 12/1977 Anderson ................ B60V 1/04
                                                                 180/119

FOREIGN PATENT DOCUMENTS

| JP | 11157650 A | * | 6/1999 |
| JP | 2002265017 A | * | 9/2002 |
| JP | 2004075022 A | * | 3/2004 |
| JP | 2008015603 A | * | 1/2008 |

OTHER PUBLICATIONS

"Oiles Bearing; 2016-2017," Oct. 31, 2016, pp. 277-278.

* cited by examiner

*Primary Examiner* — Kevin Hurley
(74) *Attorney, Agent, or Firm* — Greenblum & Bernstein, P.L.C.

(57) ABSTRACT

An assembly and inspection cart for precision equipment includes a frame that has three support portions to support the precision equipment at three points, air float devices attached to the frame at three positions, a rubber roller and a motor that are provided so as to be freely lifted and lowered with respect to the frame, and an air cylinder that lifts and lowers the rubber roller. The air float device floats the frame together with the precision equipment and forms an air layer between the frame and a floor surface. The rubber roller is arranged at a center of the three air float devices and is configured so as to press against the floor with a predetermined force when lowered by the air cylinder in a state where the frame is floated.

10 Claims, 5 Drawing Sheets

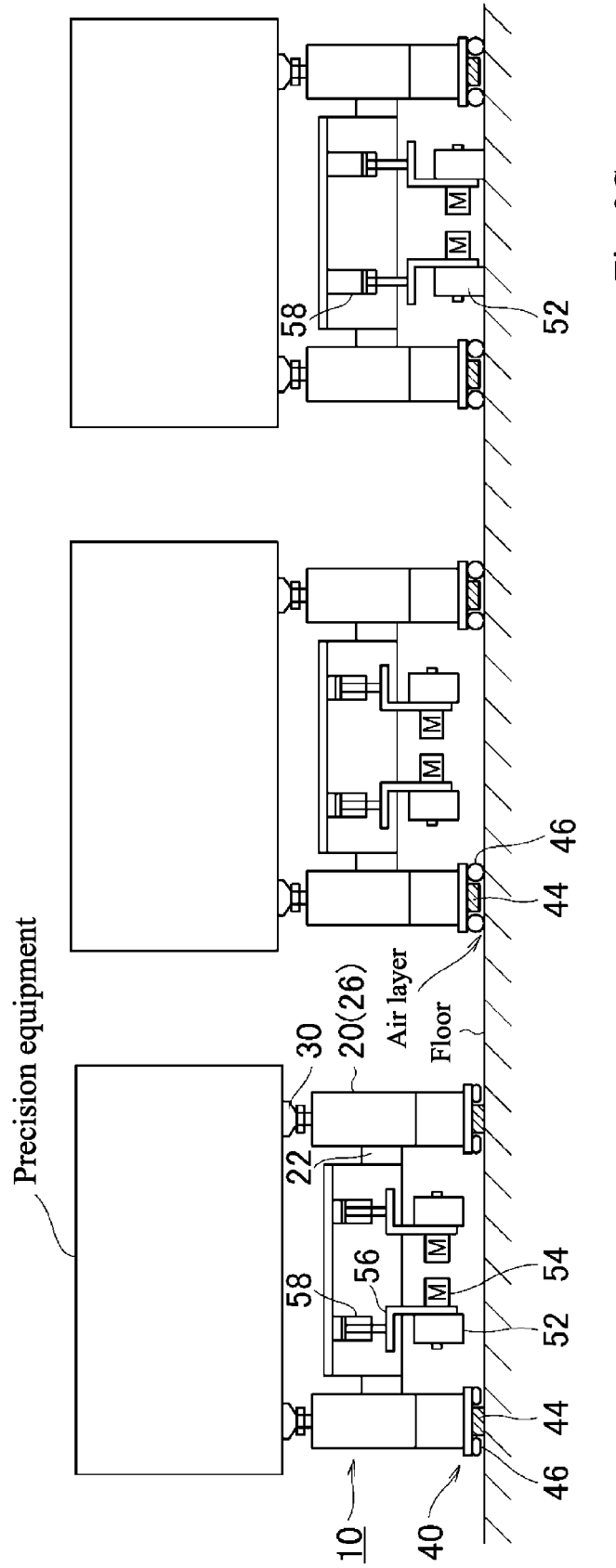

ASSEMBLY AND INSPECTION CART FOR PRECISION EQUIPMENT

CROSS-REFERENCE TO RELATED APPLICATIONS

The present application claims priority under 35 U.S.C. § 119 of Japanese Application No. 2017-235925, filed on Dec. 8, 2017, the disclosure of which is expressly incorporated by reference herein in its entirety.

BACKGROUND OF THE INVENTION

1. Field of the Invention

The present invention relates to a displacement device of a main body of precision equipment. Particularly, the present invention relates to a cart that can be displaced while carrying the precision equipment at an assembly site and an inspection site.

2. Description of Related Art

Conventionally, unlike an automobile and a home electric appliance, precision equipment such as a coordinate measuring device has not been suitable for an assembly process on an assembly line and moving the precision equipment at an assembly/inspection site has also been avoided. Once an equipment main body is placed at the assembly/inspection site, it is common not to move the equipment until the process ends. This is because vibration has a significant impact on the equipment main body under assembly. For example, when precision equipment is displaced on a typical cart with casters, the following is a list of factors causing vibration that the precision equipment in an assembly step should avoid: (1) vibration due to unevenness of a floor surface, (2) vibration generated during acceleration/deceleration, and (3) vibration from an impact during traveling.

Reasons that the precision equipment in the assembly step avoids vibration are described herewith. Precision equipment such as a coordinate measuring device often applies an air bearing to a guide such as a slider. For a finished product, a movable portion such as the guide is fixated completely, and therefore, vibration does not affect the air bearing during transport. However, when the main body is displaced during assembly or inspection, a bearing face (a gap of about 10 μm or less) of the air bearing may receive damage such as "galling" due to the effects of vibration, making it unable to maintain main body performance. For example, an operation manual of an air bearing described in "Oiles bearing 2016-2017" (page 277, [online], Oiles Corporation, [search on Oct. 31, 2016], Internet address <URL:http://www.oiles.co.jp/bearing/e_catalog/html5/book.html?fileName=bearing&page=278>), also notes a precaution of strictly forbidding transportation where strong vibration is applied. Accordingly, to displace the main body during assembly or the like, similar to the finished product, movable portions must be fixated each time and such a procedure has been avoided. Further, the air bearing is given as an example, but various kinds of precision equipment include other structural elements that should avoid the effects of vibration.

In addition, the main body of the precision equipment is heavy and heavy objects exist ranging from 500 kg to about several tens of tons. A cart capable of moving such a heavy object to a desired position while avoiding the effects of vibration is not found.

In the coordinate measuring device, for example, a model may be defined by a size of a table for a work piece and the like, and measurement ranges (X axis/Y axis) may be 500 mm/400 mm for a relatively narrow range and 1200 mm/3000 mm for a wide range. There are also larger types. Under these circumstances, work efficiency is not favorable under a condition where a worker moves along with a component and inspection equipment in an assembly process and an inspection process, while the main body of the precision equipment remains fixated. When a quantity of production of precision equipment increases, securing the space to install the main body may also be a challenge. In order to resolve the above-noted concerns, productivity must be improved by reducing production lead time more than ever before.

SUMMARY OF THE INVENTION

The present invention provides a cart for precision equipment capable of preventing vibration caused by displacement of the precision equipment from influencing a main body of the equipment, and improves productivity by displacing the precision equipment appropriately at an assembly/inspection site.

In order to resolve the above concerns, the present invention provides an assembly and inspection cart for precision equipment which includes a frame that has three support portions to support the precision equipment at three points, air floaters attached to the frame at three positions, and a drive roller and a rotation driver that are provided so as to be freely lifted and lowered with respect to the frame. The air floaters float the frame together with the precision equipment and are also provided so as to form an air layer between the frame and a floor surface. In addition, the drive roller is configured such that, in a state where the frame is floated, the drive roller is lowered by an elevator and is kept in a state of pressing against the floor surface.

With this configuration, the frame, together with the precision equipment, is floated by the air floaters and the air layer is formed between the floor surface and the frame, and therefore a friction coefficient with the floor surface is almost zero. Accordingly, the precision equipment can be displaced with little force. Further, as an effect of creating the air layer, pulse (impact) vibration is less likely to be applied to the precision equipment. Moreover, the elevator presses the drive roller onto the floor surface, and therefore the frame is displaced merely by rotating the drive roller with a small driving force from the rotation driver to allow transport of the precision equipment. In addition, when the frame is not floated by the air floater, the frame lands on the floor surface and the precision equipment is stably supported at three points.

Here, preferably, the drive roller is arranged such that a position of the drive roller in a horizontal direction with respect to the frame coincides with a center of gravity of the cart and the drive roller is further arranged at a center point between the air floaters. With this configuration, the drive roller is located at the center of gravity of the entire cart in the horizontal direction and is arranged in the center of the plurality of air floaters, and therefore, balance is readily maintained when starting and stopping the cart carrying a heavy object. Furthermore, there is little influence on the air floaters.

In addition, preferably, the drive roller includes a pair of rollers and respective rotation axes are on the same axis line, and the rotation driver is provided to each roller. With this configuration, the cart can have a turning function. Specifically, the drive roller arranged substantially in the center of the frame is configured by a pair of rollers having independent drive sources and respective rotation axes arranged so as to be on the same axis line, and therefore, the frame turns on the spot, centered on the drive roller, by driving each roller in opposite directions.

In addition, the elevator for the drive roller is preferably configured such that an air cylinder is used to press the drive roller against the floor surface. With this configuration, a pressing force can be obtained that corresponds to a pressure of supply air to the air cylinder, and therefore, the pressing force of the drive roller with respect to the floor surface can be kept constant even when the weight of the precision equipment that is placed on the cart changes, for example. Accordingly, it is possible to displace the cart by applying drive torque of an appropriate magnitude to the drive roller.

In addition, the cart of the present invention preferably further includes a controller that performs speed control and acceleration control of the drive roller. With this configuration, a displacement speed of the precision equipment can be set to match a takt time of a task, thereby facilitating response to increasing/decreasing production and the like. Furthermore, by controlling the acceleration, the vibration generated during acceleration/deceleration can be inhibited.

In addition, preferably, the cart of the present invention further includes a height changer that changes a height of the frame. With this configuration, a lifting function to change a level of the precision equipment is provided to the cart, and therefore, a work height for a worker can be kept constant by changing the height of the precision equipment according to the work content.

In addition, the three support portions are preferably each provided with a level adjuster that adjusts a height of the respective support portion. The degree of flatness of the floor surface of the site is not very high. Conventionally, when precision equipment is installed, performing a horizontal leveling once is enough. However, when the cart of the present invention is used, the horizontal leveling is required for each displacement position of the precision equipment. When the cart is provided with a level adjuster, as in this configuration, a burden of level adjustment at the time of displacement is reduced and workability can be improved.

In addition, preferably, the cart of the present invention further includes a collision prevention sensor taking safety into consideration.

In addition, preferably, the cart of the present invention further includes a detector detecting a guidance tape provided on the floor surface and a displacement controller that displaces the cart according to content detected by the detector. With this configuration, a user can easily set a displacement route of the cart merely by attaching the guidance tape, which can be detected by the detector of the cart, to the floor. Accordingly, even in an existing assembly site, various work layouts can be constructed easily.

An assembly and inspection method of the precision equipment of the present invention divides the assembly or inspection site into a plurality of stations having different work content. The cart according to any one of the aspects described above is used to displace the precision equipment under assembly or inspection to the next station while carrying the precision equipment.

According to the configuration of the present invention, the cart can be provided which can prevent vibration caused by displacement of the precision equipment from influencing the equipment main body. As a result, when the cart of the present invention is used at the assembly/inspection site, appropriate displacement of the precision equipment allows a position of the worker to be fixated and enables a component and inspection equipment to be supplied precisely on time. Therefore, standardization of assembly work and inspection work of the precision equipment and work efficiency are enhanced and productivity can be expected to improve drastically.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3A to 3C are schematic front views illustrating operations of the cart;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
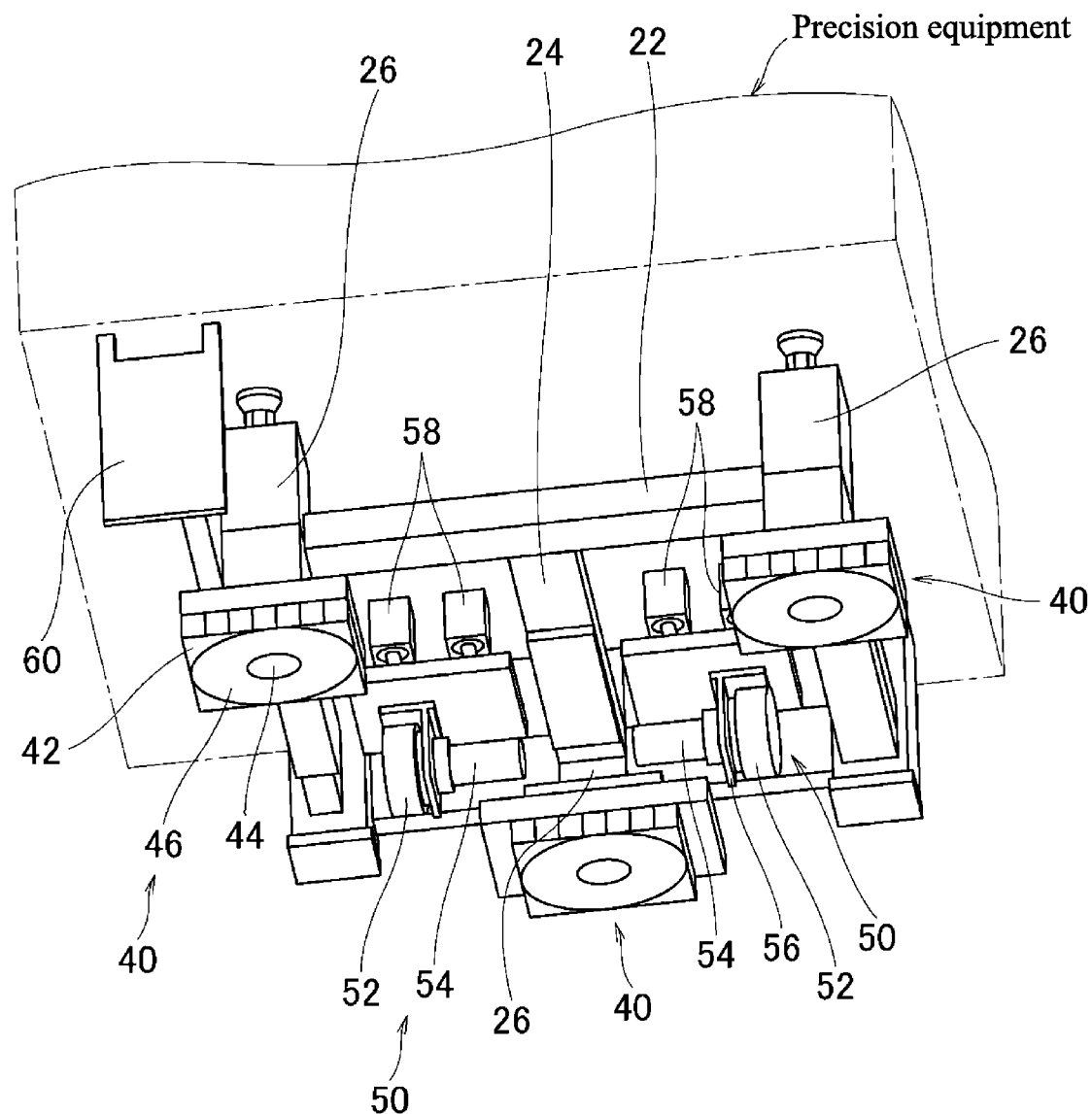
FIG. 1 is an overall perspective view of a cart according to an embodiment of the present invention, as viewed from below.
Figure 2A:
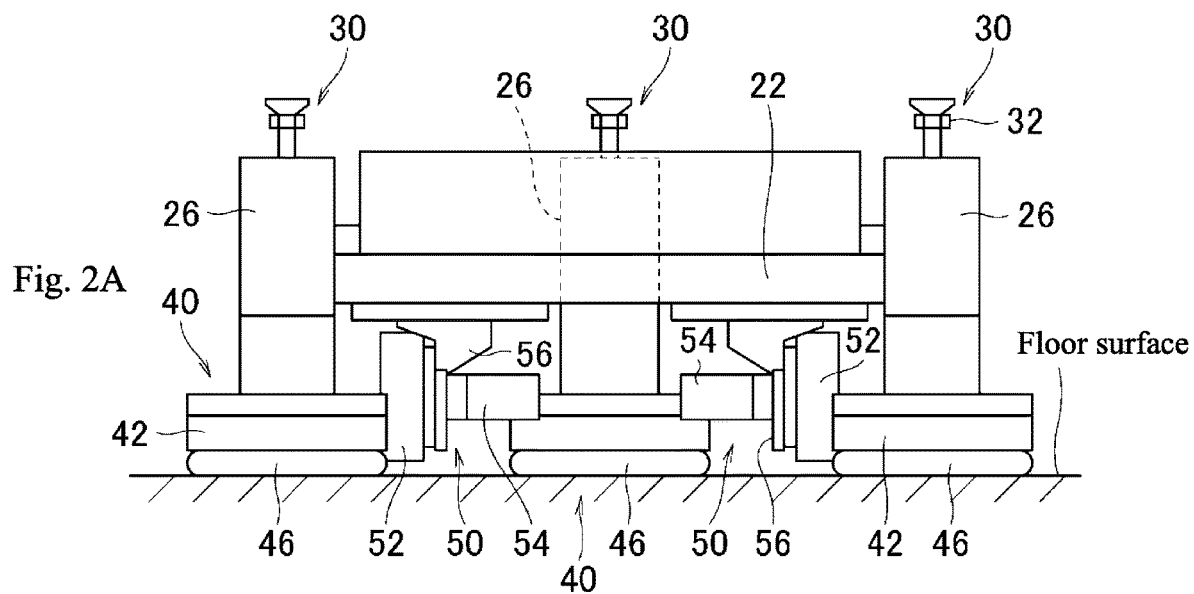
FIG. 2A is a front view and 2B is a bottom view illustrating a schematic configuration of the cart.
Figure 2B:
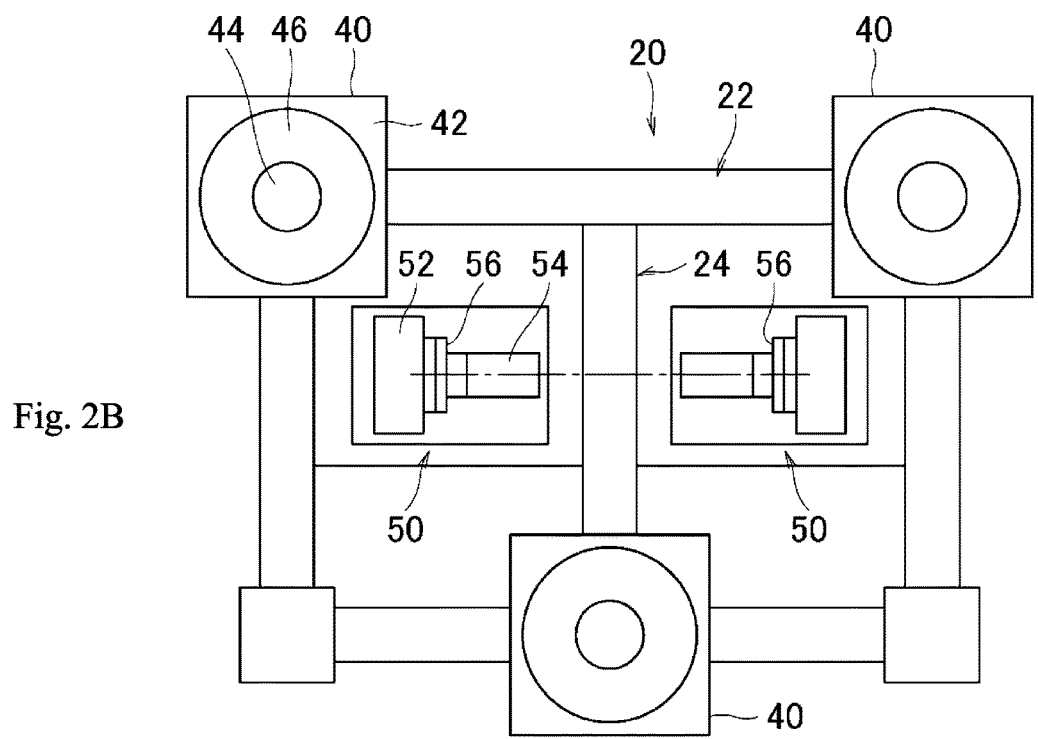

Hereafter, a preferred embodiment of the present invention is described with reference to the drawings. FIG. 1 is a perspective view from below of an assembly cart for precision equipment according to the present embodiment, in a state where the precision equipment is placed on the cart. In addition, FIG. 2A is a front view and FIG. 2B is a bottom view illustrating a schematic configuration of the cart. A cart 10 is a self-propelled type and displaces a main body of the precision equipment under assembly to various positions and can serve, without modification, as a table for assembly at the post-displacement position. Primary structural components of the cart 10 include a frame 20, three-point support members (supports or support portions) 30 having level maintenance mechanisms (level adjusters) 32 provided at three positions at the top of the frame 20, an air float device 40 provided at three positions at the bottom of the frame 20, and a drive roller 50 that is arranged at a center of the air float devices 40. Hereafter, a description is given for the assembly cart, but the cart 10 can also be applied to an inspection process.

The frame 20 illustrated in FIGS. 1 to 2B is only an example. The frame 20 includes a frame body 22 formed in an overall quadrangular shape and a member 24 connecting center portions of long sides of the quadrangular frame body 22. Of the four corners of the quadrangular frame body 22, the front two corners (both ends of the front long side) in FIG. 1 are each provided with a vertical member 26 extending in a height direction. In addition, one vertical member 26 is also provided similarly at a center of the rear long side of the quadrangular frame body 22 (an end on a rear side of the center connecting member 24). These three vertical members 26 are provided with the support members 30 having the level maintenance mechanisms 32 at a top end of each and can support the precision equipment at three points. In addition, the air float devices 40 are respectively provided to a lower end of each of the three vertical members 26. Moreover, the vertical member 26 has a built-in lift device (lift, or height changer) that elevates and lowers the air float devices 40 about 400 mm in a vertical direction. In a state where the three air float devices 40 are grounded on a floor surface and the cart 10 stands on the floor surface, when the three lift devices are operated by an electric or air drive, the frame 20 moves in the vertical direction together with the quadrangular frame body 22 and a height adjustment of the precision equipment supported at three points is performed. When such a lift device is operated, the height of assembly work, which differs in accordance with the work content, can be aligned.

The air float device 40 is now described. An advantage of the air float device 40 is to inhibit the occurrence of vibration during displacement of the precision equipment. The air float device 40 illustrated in FIG. 1 includes a base 42, a ground pad 44 (center portion) arranged on a back surface (floor side surface) of the base 42, and a donut-shaped bag 46 (peripheral portion). The donut-shaped bag 46 expands by air (compressed air) being sent from a flow path that is formed inside the base 42 and becomes thicker than the ground pad 44. Further, the bag 46 shrinks when the air is stopped and becomes thinner than the ground pad 44. Accordingly, when the air is stopped, not the bag 46, but the ground pad 44 touches the floor surface and the entire cart 10 stands supported at three points by the three ground pads 44. On the other hand, when the air is supplied, the expanded bag 46 lifts the frame 20 together with the precision equipment. Simultaneously, a closed space is formed at the center of the donut by the expanded bag 46 and air is also sent there. In this way, a state is maintained in which a heavy object is lifted up to a predetermined height (about 5 mm to several tens of millimeters, and preferably about 20 mm) from the floor surface by air pressure. In addition, air leaks out from a gap between the donut-shaped bag 46 and the floor surface, forming an air layer there that is about 0.5 mm to several millimeters. With this configuration, the heavy object is maintained in a floating state.

Further, air passing through a hose and the like from outside is supplied to an air controller 60 that is fixated to the frame 20 and air that is pressure-adjusted by the controller 60 is distributed to each of the air float devices 40. In place of supplying air with the hose from outside, the cart may hold a tank filled with the necessary compressed air.

The level maintenance mechanisms 32 which are mounted to the three-point support members 30 at the top of the frame 20 can each adjust the height of the respective support member 30 by about ±15 mm. A leveling (finding the horizontal) of the precision equipment supported at three points is performed by adjusting the height of each support member 30 electrically or manually. Further, leveling adjustment of the precision equipment main body is extremely important in the assembly and inspection processes. Typically, flatness of the floor at the assembly site is low in level and the leveling adjustment must be performed for each position where the equipment main body is set. When the cart 10 is provided with the level maintenance mechanisms 32 as in the present embodiment, the leveling adjustment of the equipment main body can be performed smoothly at the post-displacement position. Furthermore, by detecting a horizontal direction using an electric level and the like, automatic leveling adjustment becomes possible.

The drive roller 50 is now described. The drive roller 50 is configured with a pair of urethane rubber rollers 52 and is arranged in a position of a center of gravity of the entire cart 10 in the horizontal direction. Specifically, at positions symmetrically centered on the center of gravity of the cart 10, two rollers 52 are aligned such that each rotation axis lies on the same axis line. The roller 52 is preferably made of a rubber such as urethane rubber. Each roller 52 is connected to an independent drive motor 54. Further, the center position of the drive roller 50, as shown in FIG. 1, may be arranged to match the position of a center of gravity of a triangle formed by the three air float devices 40.

An elevator for the drive roller 50 is now described. A roller holder member 56 which bears each roller 52 is supported by an air cylinder 58 so as to be freely lifted and lowered. In FIG. 1, each roller 52 is configured so as to be able to be independently lifted and lowered, but two rollers 52 may be lifted and lowered by a common elevator. A fixed end of the air cylinder 58 is connected to a substrate that is fixated to the frame 20 and a movable end of the air cylinder 58 is connected to the roller holder member 56.

An operation of the cart 10 is described based on FIGS. 3A to 3C. FIG. 3A illustrates a state where the precision equipment is placed stably on the cart 10, supported at three points. In other words, the air float devices 40 are stopped and the cart 10 stands in a state where the ground pads 44 touch the floor surface. The drive roller 50 is at the highest position, lifted by the air cylinders 58. In this state, the work of assembling the precision equipment that is placed on the cart 10 is performed.

When displacing the position of the precision equipment under assembly, as shown in FIG. 3B, the cart 10 is floated together with the precision equipment by supplying air to the air float devices 40. Accordingly, there is almost no frictional force between the cart 10 and the floor surface. In addition, as shown in FIG. 3C, by operating the air cylinders 58, the rollers 52 are lowered to a position where the rollers 52 contact the floor surface. When the rollers 52 are rotated in a state depicted in FIG. 3C, the cart 10 can be displaced with a small drive force.

Moreover, starting the air float devices 40 and the lowering operation of the drive roller 50 may be performed simultaneously or the cart 10 may be floated after the drive roller 50 is lowered.

Figures 4A, 4B:
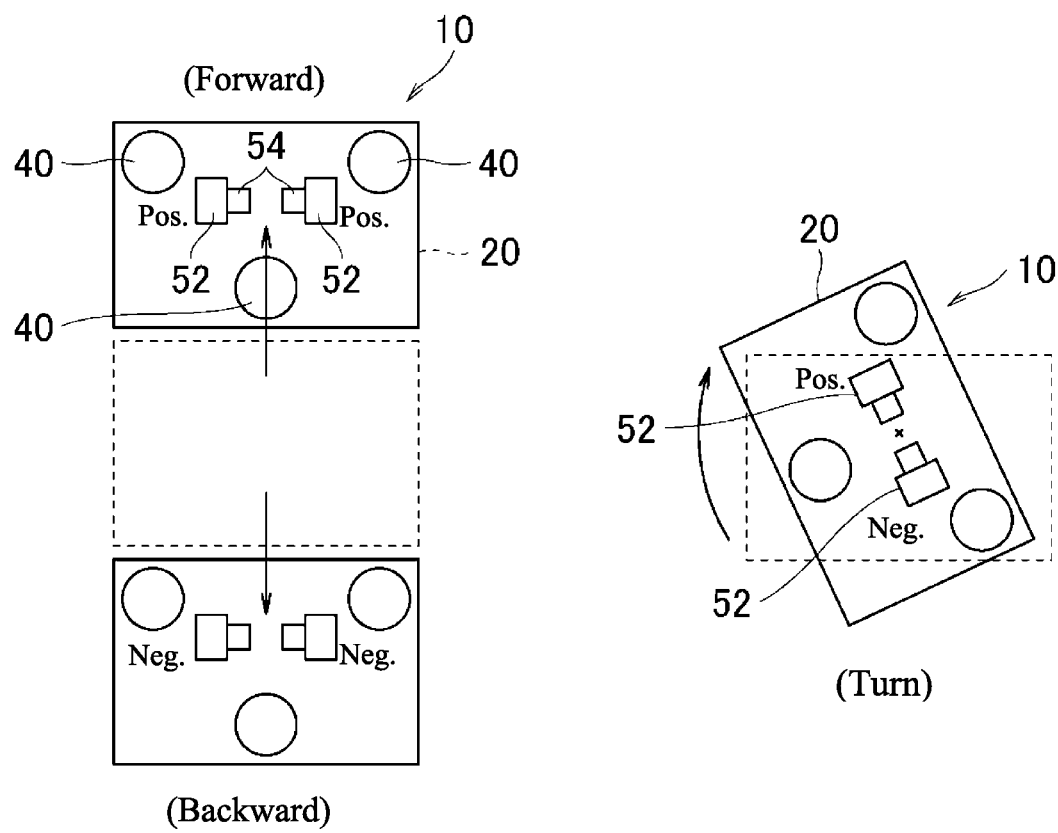
FIGS. 4A and 4B are schematic plan views illustrating operations of the cart.

Displacement and turning operations of the cart 10 are described based on FIGS. 4A and 4B. As shown in FIG. 4A, when the two rollers 52 are rotated simultaneously in the same direction (normal or reverse rotation), the cart 10 moves forward/backward. In contrast, as shown in FIG. 4B, when the two rollers 52 are simultaneously rotated in opposite directions from each other (the first roller in normal rotation and the second roller in reverse rotation), the cart 10 turns on the spot (clockwise or counterclockwise). By combining these operations, the precision equipment that is placed on the cart 10 can be displaced to a desired position at the assembly site. For example, when the left side roller is stopped or rotated at a lower speed with respect to the right side roller, a travel direction of the cart 10 turns to the left. On the other hand, when the right side roller is stopped or rotated at a lower speed with respect to the left side roller, the travel direction of the cart 10 turns to the right.

After the precision equipment is displaced to a target position by the operations noted above, the air float devices 40 are stopped and the drive roller 50 is lifted by the air cylinders 58, thereby configuring the cart 10 for a period of assembly (FIG. 3A) and the subsequent assembly work is performed.

In the present embodiment, a displacement speed/acceleration control device is provided to drive-control the drive roller 50. This controller controls the displacement speed of the cart 10 to match a takt time corresponding to a quantity of production. Further, in order to displace the heavy object with suppressed vibration, the controller controls the acceleration when the cart 10 starts moving and stops.

In addition, in the present embodiment, a magnetic sensor is preferably attached to the cart 10. The magnetic sensor can read magnetic characteristics (such as magnetic field strength and magnetic flux density) of a magnetic tape attached to the floor. When the displacement control device of the cart 10 controls the drive roller based on the information read from the magnetic tape, the cart 10 can be displaced so as to follow a line formed by the magnetic tape. As a result, rectilinear travel of the cart 10 is maintained. Further, a route change can be readily performed by replacing the magnetic tape as needed, or by covering a surface of the tape with a shield tape, for example.

Collision prevention sensors are preferably attached to the cart 10 (front and back) as a safety measure. Furthermore, pressure sensors to prevent being caught between objects are preferably attached to the front and back of the cart 10 (also to both sides of the cart 10 in consideration of preventing the cart 10 from being trapped between objects when turning left and right).

According to the cart 10 of the present embodiment, while maintaining a state where the precision equipment is supported at three points, the air float devices 40 cause the cart 10 to float together with the precision equipment, enabling displacement and turning operations of the cart 10 by the drive roller 50. Moreover, the precision equipment under assembly can be transported to a desired position without being affected by vibration caused by the displacement and turning operations. Furthermore, it is possible to create a stable state supported at three points immediately after displacement.

When the cart 10 of the present embodiment is used, a heavy object such as a coordinate measuring device weighing between 500 kg and several tens of tons can be displaced.

In the present embodiment, since a structure is adopted where the drive roller 50 is lifted and lowered by the air cylinders 58, a proper drive torque can be generated in an air floating state. As a result, a heavy object such as the precision equipment can be displaced with minimum force.

In the cart 10 of the present embodiment, the lift device that can change the height of the frame 20 is mounted to the cart 10, and therefore, the height of the precision equipment can be changed in accordance with the work content and the work height for the worker can be kept constant.

Figure 5:
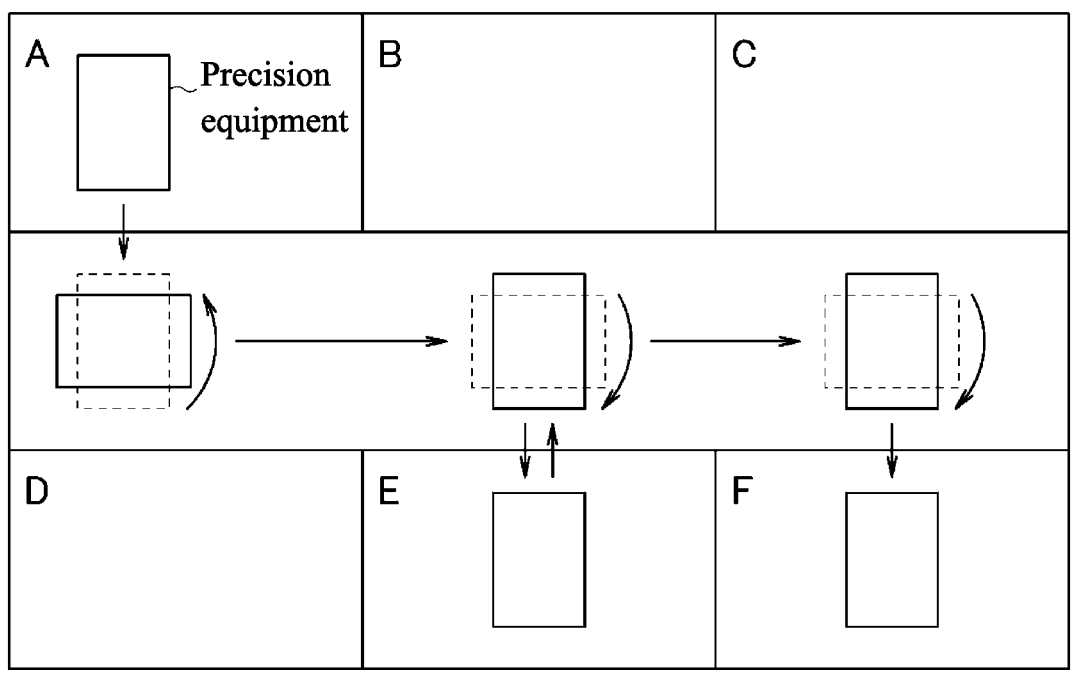
FIG. 5 illustrates a method of assembling precision equipment using the cart.

When the cart of the present embodiment is used, an assembly method can be achieved in which, as shown in FIG. 5 for example, the assembly site is divided into a plurality of stations A to F having different work content and the precision equipment under assembly is displaced sequentially to the stations for performing necessary work (such as A→E→F) while the precision equipment is carried on the cart.

As a result, when the cart 10 of the present embodiment is used at the assembly/inspection site, appropriate displacement of the precision equipment allows a position of the worker to be fixated and enables a component and inspection equipment to be supplied precisely on time. Accordingly, standardization of assembly work and inspection work on the precision equipment and work efficiency are enhanced and productivity can be expected to improve drastically.

The present invention can be applied to a displacement device of a main body of precision equipment such as a three-dimensional coordinate measuring apparatus, including a coordinate measuring device, an image measuring device, a machine tool, and a precision position determiner.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A cart for precision equipment, the cart comprising:
   a frame that has three supports to support the precision equipment at three points;
   a plurality of air floaters attached to the frame at three respective positions;
   a drive roller; and
   a rotation driver, wherein:
      the drive roller and rotation driver are each freely lifted and lowered with respect to the frame,
      at least one of the drive roller and the rotation driver are mounted within the frame,
      the plurality of air floaters float the frame together with the precision equipment and form an air layer between the frame and a floor surface, and
      the drive roller is configured such that, in a state where the frame is floated, the drive roller is lowered by an elevator and is pressed against the floor surface.

2. The cart according to claim 1, wherein:
   a position of the drive roller in a horizontal direction with respect to the frame coincides with a center of gravity of the cart, and
   the drive roller is arranged at a center point between the plurality of air floaters.

3. The cart according to claim 2, wherein:
   the drive roller comprises a pair of rollers,
   respective rotation axes of the pair of rollers are on the same axis line, and
   the rotation driver is provided to each roller.

4. The cart according to claim 1, wherein the elevator for the driver roller is configured such that an air cylinder is used to press the drive roller against the floor surface.

5. The cart according to claim 1, further comprising a controller that performs speed control and acceleration control of the drive roller.

6. The cart according to claim 1, further comprising a lift that changes a height of the frame.

7. The cart according to claim 1, wherein the three supports each includes a level adjuster that adjusts a height of the respective supports.

8. The cart according to claim 1, further comprising a collision prevention sensor configured to detect a collision.

9. The cart according to claim 1, further comprising:
 a detector that detects a guidance tape provided on the floor surface; and
 a displacement controller that displaces the cart according to data of the guidance tape detected by the detector.

10. A method of precision equipment assembly and inspection, the method comprising:
 dividing one of an assembly and an inspection site into a plurality of stations having different work content; and
 displacing the precision equipment under assembly or inspection to the next station using a cart which carries the precision equipment, the cart having:
  a frame that has three supports supporting the precision equipment at three points;
  a plurality of air floaters attached to the frame at three respective positions;
  a drive roller; and
  a rotation driver, wherein:
   the drive roller and rotation driver each freely lifted and lowered with respect to the frame,
   at least one of the drive roller and the rotation driver are mounted within the frame,
   the plurality of air floaters float the frame together with the precision equipment and form an air layer between the frame and a floor surface, and
   in a state where the frame is floated, an elevator lowers the drive roller such that the drive roller is pressed against the floor surface.

* * * * *